US012605979B2

(12) United States Patent
    Yamashita et al.

(10) Patent No.:    US 12,605,979 B2
(45) Date of Patent:        Apr. 21, 2026

(54) LOWER ARM FOR VEHICLE SUSPENSION

(71) Applicant: Nissan Motor Co., Ltd., Yokohama (JP)

(72) Inventors: Takuya Yamashita, Kanagawa (JP);
    Yunosuke Yamada, Kanagawa (JP);
    Kohei Nishikawa, Kanagawa (JP)

(73) Assignee: Nissan Motor Co., Ltd., Yokohama (JP)

( * ) Notice:  Subject to any disclaimer, the term of this patent is extended or adjusted under 35 U.S.C. 154(b) by 0 days.

(21) Appl. No.: 19/110,855

(22) PCT Filed:  Sep. 13, 2022

(86) PCT No.:  PCT/JP2022/034241
    § 371 (c)(1),
    (2) Date:  Mar. 12, 2025

(87) PCT Pub. No.: WO2024/057407
    PCT Pub. Date: Mar. 21, 2024

(65) Prior Publication Data
    US 2026/0091631 A1      Apr. 2, 2026

(51) Int. Cl.
    *B60G 7/00*        (2006.01)
(52) U.S. Cl.
    CPC ............. *B60G 7/001* (2013.01); *B60G 7/005* (2013.01)
(58) Field of Classification Search
    CPC ................................. B60G 7/001; B60G 7/005
    See application file for complete search history.

(56) References Cited

U.S. PATENT DOCUMENTS

| | | | | | |
|---|---|---|---|---|---|
| 5,607,177 A | * | 3/1997 | Kato | ...................... | B60G 7/001 |
| | | | | | 280/124.134 |
| 11,072,375 B2 | * | 7/2021 | Darin | ................... | B62D 27/026 |
| 11,541,710 B2 | * | 1/2023 | Hoschouer | ............. | B60G 7/005 |
| 12,097,742 B2 | * | 9/2024 | Jeong | ..................... | B60G 7/001 |
| 12,491,741 B2 | * | 12/2025 | Matsuoka | .............. | B60G 7/001 |
| 2009/0066049 A1 | * | 3/2009 | Kunert | ................... | B60G 7/001 |
| | | | | | 280/124.134 |

(Continued)

FOREIGN PATENT DOCUMENTS

| | | | |
|---|---|---|---|
| JP | H1-122529 U | 8/1989 | |
| JP | H8-67120 A | 3/1996 | |

(Continued)

*Primary Examiner* — Paul N Dickson
*Assistant Examiner* — Shams Dhanani
(74) *Attorney, Agent, or Firm* — Spencer Fane LLP

(57) ABSTRACT

A lower arm for an automotive vehicle suspension includes a main body part including first, second and third mounting portions. The first mounting portion extends inward in a vehicle width direction and is attached at a distal end thereof to a vehicle body side. The second mounting portion extends inward in the vehicle width direction and is attached at a distal end thereof to a rear side of the vehicle body with respect to the first mounting portion. The third mounting portion extends outward in the vehicle width direction and is attached at a distal end thereof to a wheel side. A second portion between the first mounting portion and the second mounting portion is configured to be fragile against an input from a front side of the vehicle as compared with a first portion between the first mounting portion and the third mounting portion.

6 Claims, 8 Drawing Sheets

(56) References Cited

U.S. PATENT DOCUMENTS

| | | | | |
|---|---|---|---|---|
| 2011/0272911 A1* | 11/2011 | Gerhards | ............... | B60G 7/001 |
| | | | | 280/124.134 |
| 2012/0153592 A1* | 6/2012 | Mielke | ..................... | B60G 3/04 |
| | | | | 280/124.134 |
| 2013/0205591 A1* | 8/2013 | Santini | ................... | B60G 7/001 |
| | | | | 29/897.2 |
| 2014/0361508 A1* | 12/2014 | Ohta | ..................... | B60G 7/001 |
| | | | | 280/124.134 |
| 2024/0083377 A1* | 3/2024 | Shah | ...................... | B60R 19/34 |

FOREIGN PATENT DOCUMENTS

| | | | |
|---|---|---|---|
| JP | 2007-118664 A | 5/2007 |
| JP | 2008-120375 A | 5/2008 |
| JP | 2013-10419 A | 1/2013 |

\* cited by examiner

300

400

1

P₁

P₂

100

RIGHT

FRONT ◄········○········► REAR

LEFT

LOWER ARM FOR VEHICLE SUSPENSION

CROSS-REFERENCE TO RELATED APPLICATIONS

This application is a U.S. national stage application of International Application No. PCT/JP2022/034241, filed on Sep. 13, 2022.

BACKGROUND

Technical Field

The present invention relates to a lower arm (transverse link) that configures a suspension for an automotive vehicle.

Background Information

A front suspension body of a vehicle includes, for example, a pair of transverse links, a cross member connected to ends of a pair of links extending from substantially the center of the transverse link, and a stiffening cover fixed to a rear side of the cross member (refer to Japanese Patent Laid-Open No. 2007-118664, which is hereinafter referred to as Patent Document 1). The transverse link may also be called a lower arm.

In this prior art, in consideration of a collision occurring at the center of the front side of the vehicle, the stiffening cover is designed to be fixed to the cross member so as to be detachable downward from the cross member or so as to be bendable downward from the cross member, thereby absorbing the collision force (refer to paragraphs [0016] to [0019] and FIGS. 3 and 4 of Patent Document 1).

SUMMARY

However, in the above-mentioned conventional front suspension body, a collision in which the amount of overlap between the front side of a vehicle body and a collision object in a vehicle width direction is small (so-called small overlap collision) is not taken into consideration. Therefore, there is room for improvement to ensure sufficient shock absorption in the small overlap collision.

An object of the present invention is to provide a lower arm that can further enhance the shock absorption during a collision.

The present invention solves the above problem by configuring a second portion between a first mounting portion and a third mounting portion of a plate-like main body part to be fragile against an input from the front side of the vehicle, compared with a first portion between the first mounting portion and a second mounting portion of the main body part.

The present invention can further enhance the shock absorption during a collision.

BRIEF DESCRIPTION OF DRAWINGS

Referring now to the attached drawings which form a part of this original disclosure, illustrative embodiments are shown.

DETAILED DESCRIPTION OF EMBODIMENTS

Figure 1:
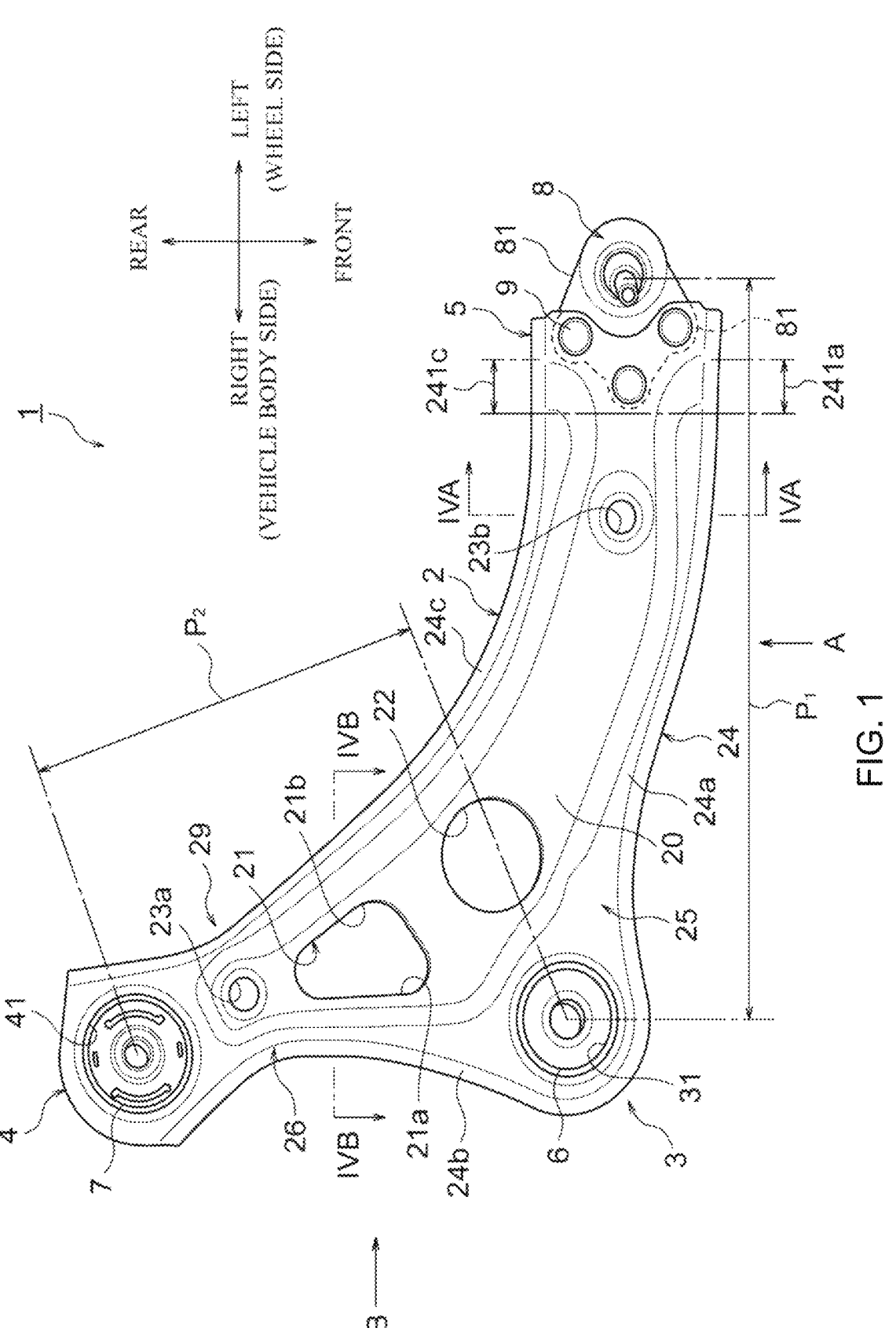
FIG. 1 is a plan view illustrating an embodiment of a lower arm according to the present invention.
Figure 2:
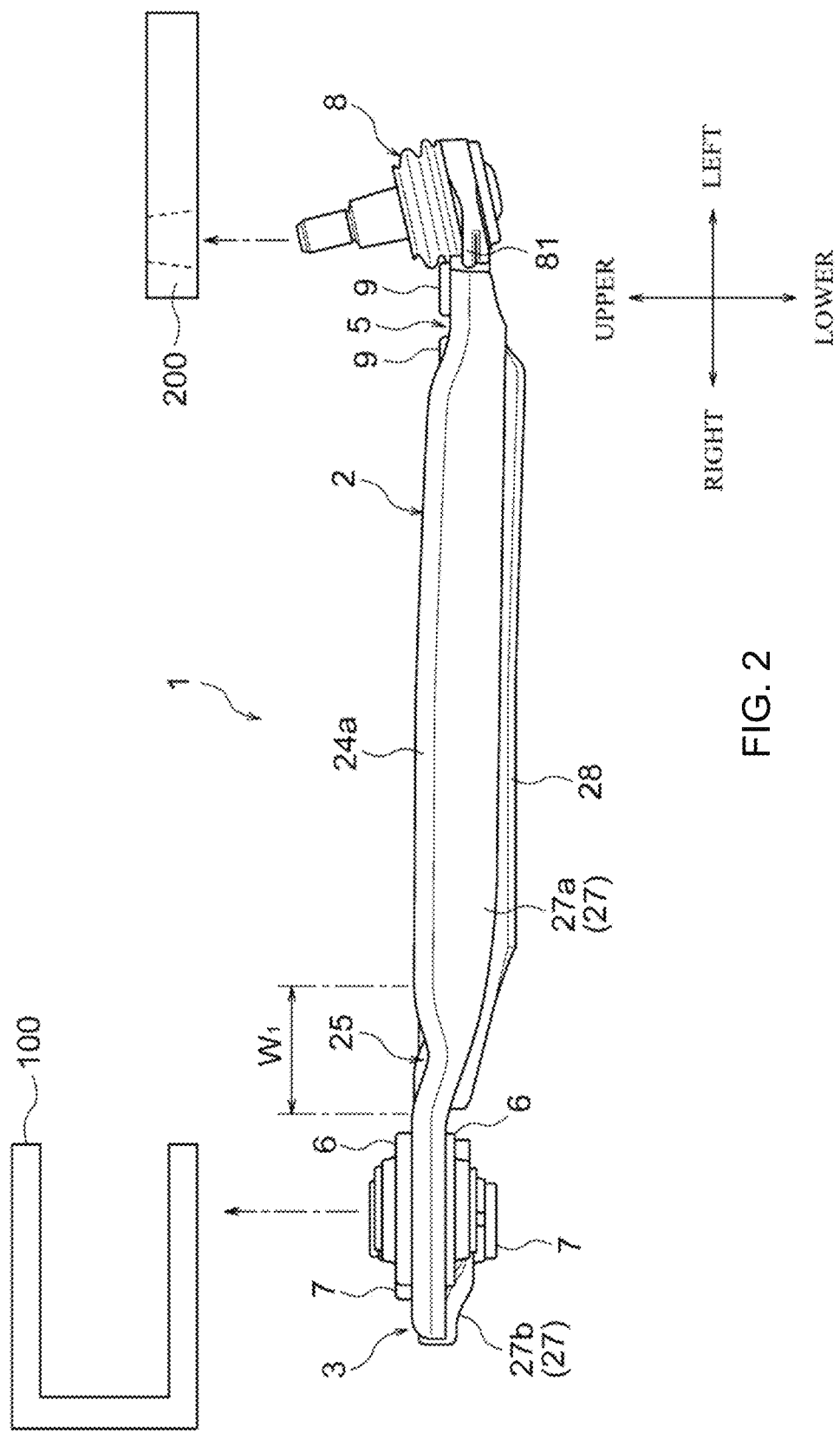
FIG. 2 is a view seen from arrow A in FIG. 1.
Figure 3:
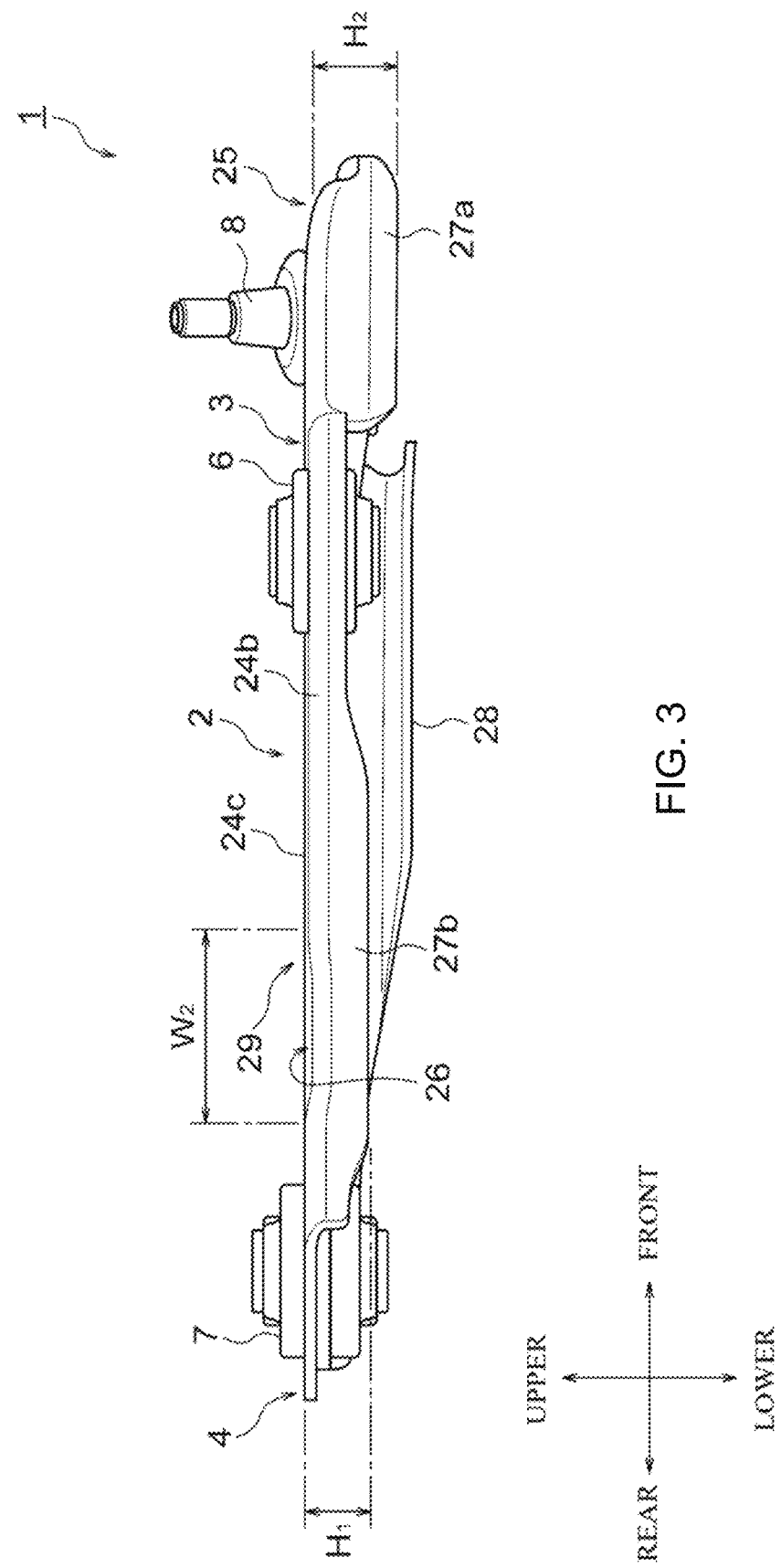
FIG. 3 is a view seen from arrow B in FIG. 1.
Figure 4A:
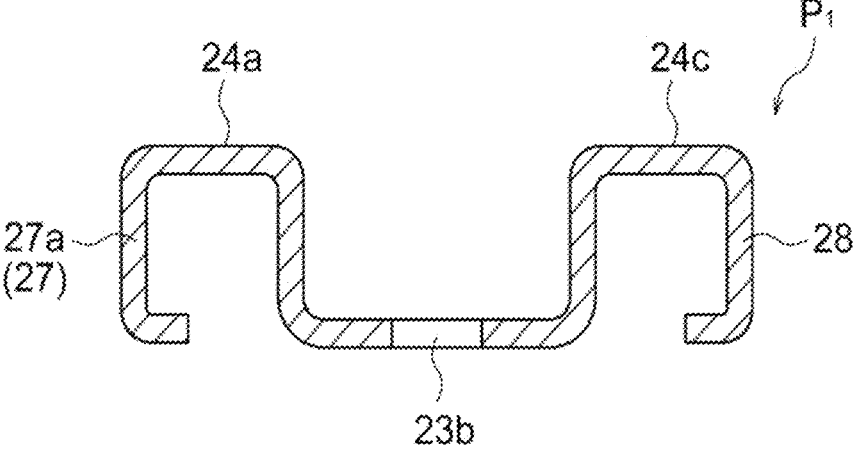
FIG. 4A is a cross-sectional view of a main body part taken along line IVA-IVA in FIG. 1.
Figure 4A:
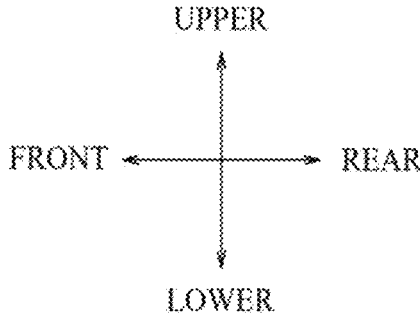
Figure 4B:
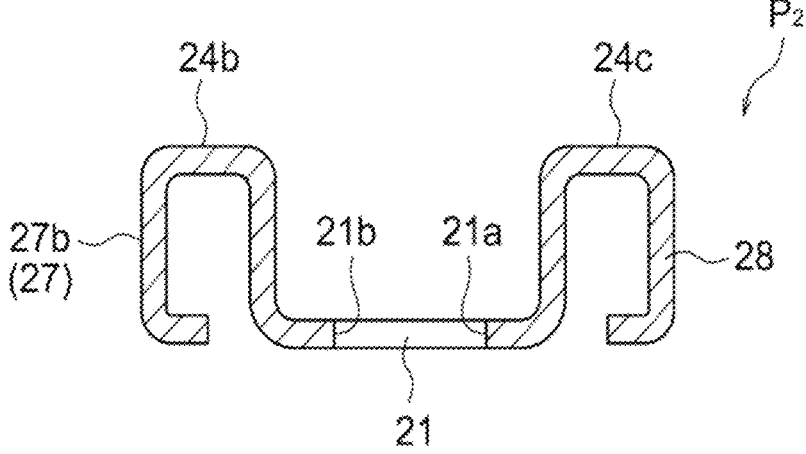
FIG. 4B is a cross-sectional view of the main body part taken along line IVB-IVB in FIG. 1.
Figure 4B:
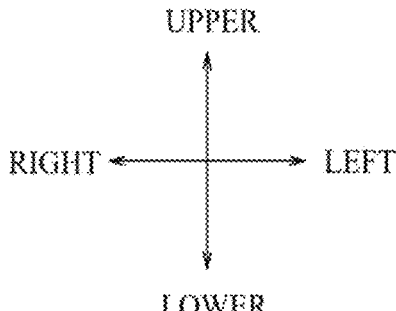
Figure 5:
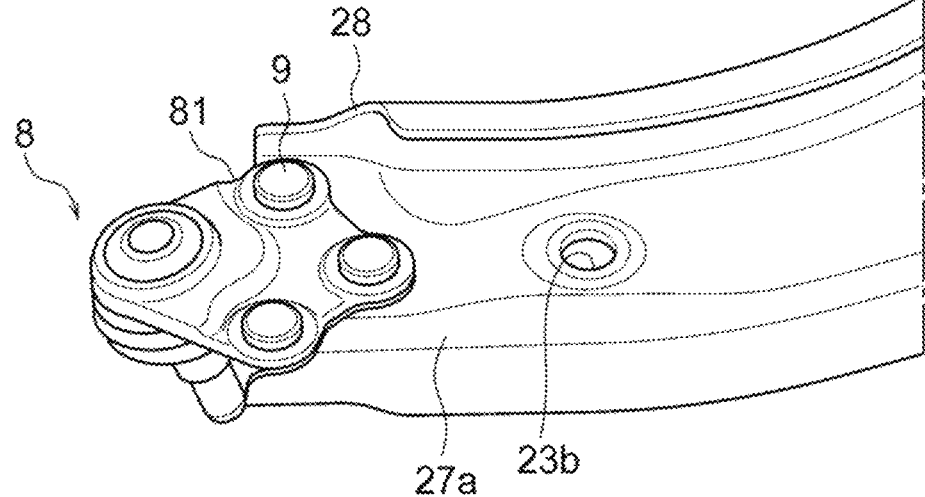
FIG. 5 is a rear view illustrating an exemplary third mounting portion and an exemplary ball joint, which constitute the lower arm of FIG. 1.
Figure 5:
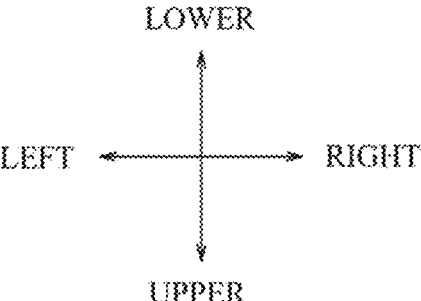

A lower arm 1 according to an embodiment of the present invention will be described with reference to the drawings. FIG. 1 is a plan view illustrating an example of the lower arm 1 in the present embodiment. FIG. 2 is a side view of the lower arm 1 seen from the direction of arrow A in FIG. 1. FIG. 3 is a side view of the lower arm 1 seen from the direction of arrow B in FIG. 2. FIG. 4A is a cross-sectional view taken along line IVA-IVA in FIG. 1. FIG. 4B is a cross-sectional view taken along line IVB-IVB in FIG. 1. FIG. 5 is a rear view exemplarily illustrating a third mounting portion 5 and a ball joint 8, which constitute the lower arm 1 in the present embodiment.

FIGS. 1 to 5 exemplarily illustrate the lower arm 1 constituting a front suspension provided for a left front wheel of an automotive vehicle. The lower arm 1 in the present embodiment is a component that constitutes a front suspension of the types such as Macpherson strut type, although it is not limited particularly. The lower arm 1 usually constitutes a lower part of the front suspension.

As illustrated in FIGS. 1 to 3, the lower arm 1 includes a plate-like main body part 2. The main body part 2 is a metal plate made of a metallic material such as iron. The plate-like main body part 2 can be manufactured by press-working a metal plate being substantially uniform in whole thickness, although not particularly limited.

FIG. 1 illustrates the main body part 2 in the present embodiment being substantially L-shaped in planar view. The main body part 2 includes a first mounting portion 3 extending inward in a vehicle width direction (right side in the drawing), a second mounting portion 4 extending inward in the vehicle width direction, and the third mounting portion 5 extending outward in the vehicle width direction (left side in the drawing).

The first mounting portion 3 is provided in a right front region of the main body part 2. The first mounting portion 3 has a distal end formed with a mounting hole 31 into which a front suspension bush 6 can be fixed. As illustrated in FIG. 2, the distal end of the first mounting portion 3 is attached to a vehicle body side component 100 via the front suspension bush 6. The vehicle body side component 100 is not limited particularly as long as it serves as a component constituting the vehicle body, and may be a front side member of an automotive vehicle body, a front suspension member, or the like.

The second mounting portion 4 is provided in a right rear region of the main body part 2. The second mounting portion 4 has a distal end formed with a mounting hole 41 into which a rear suspension bush 7 can be fixed. The distal end of the second mounting portion 4 is attached to the vehicle body side component 100 via the rear suspension bush 7 on a rear side of the vehicle body with respect to the first mounting portion 3.

The third mounting portion 5 is provided in a left front region of the main body part 2. The third mounting portion 5 has a distal end (left end) to which a fixing plate part 81 of the ball joint 8 is fixed via a plurality of rivets 9. FIG. 5 illustrates the fixing plate part 81 of the present embodiment fixed to a lower surface of the third mounting portion 5. Alternatively, the fixing plate part 81 may be fixed to an upper surface of the third mounting portion 5. The fixing plate part 81 in this embodiment corresponds to an exemplary "mounting portion of the ball joint" in the present invention. Although the rivets 9 are employed in the illustrated example, the means for fixing the fixing plate part 81 to the distal end (the left end) of the third mounting portion 5 is not limited particularly and may be bolts.

FIG. 2 illustrates the distal end of the third mounting portion 5, which is attached to a wheel side component 200 via the ball joint 8. The wheel side component 200 is not limited particularly and may be a component connected to the wheel such as a knuckle and a hub, or the like.

As illustrated in FIG. 1, the main body part 2 has a first region $P_1$ extending in the vehicle width direction (left-right direction in the drawing) between the first mounting portion 3 and the third mounting portion 5 described above. On the other hand, the main body part 2 has a second region $P_2$ extending in a vehicle front-rear direction between the first mounting portion 3 and the second mounting portion 4. Although a detailed structure will be described below, in the lower arm 1, the first region $P_1$ of the main body part 2 is configured to be fragile in mechanical strength against an input from the front side of the vehicle (external force such as impact in collision), compared with the second region $P_2$ of the main body part 2.

Figure 6A:
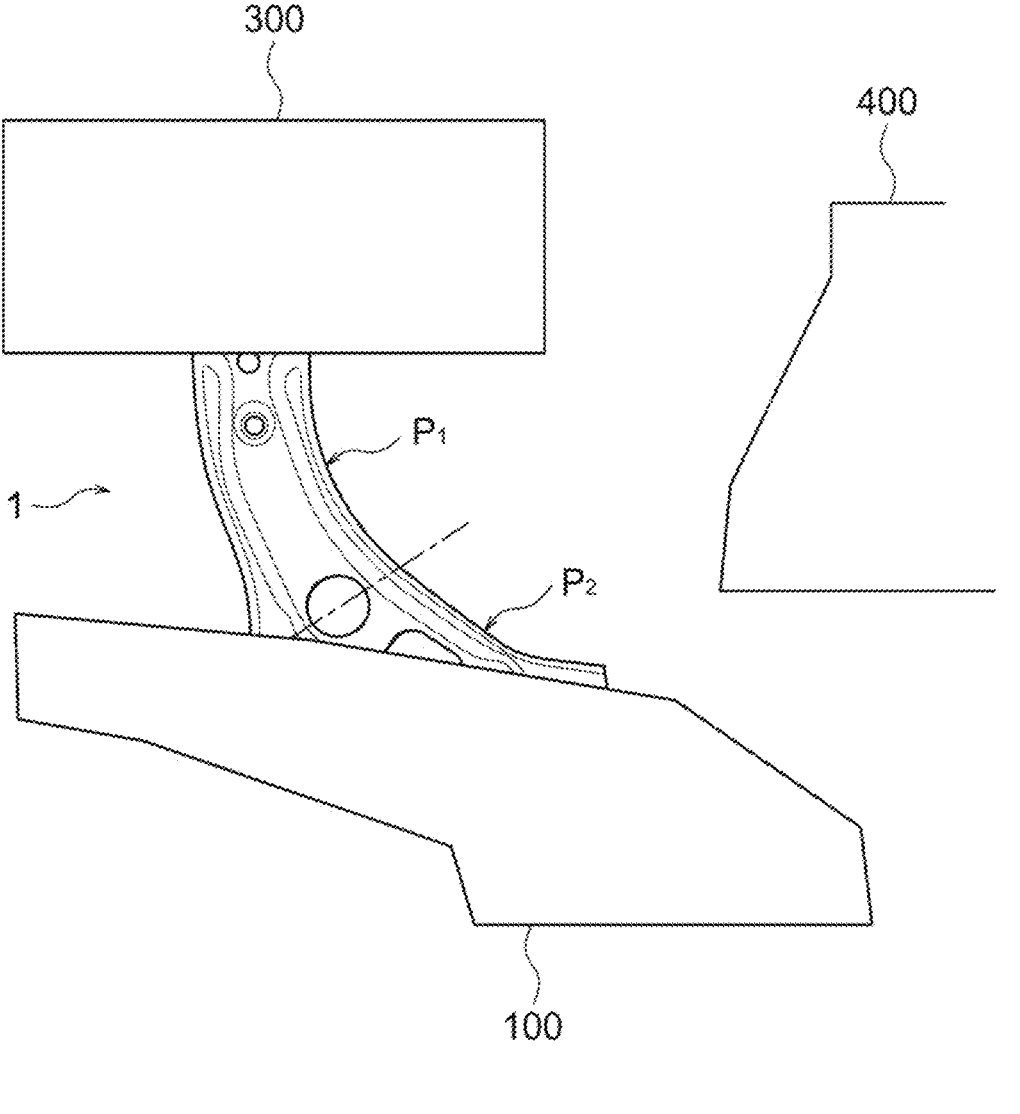
FIG. 6A is a plan view (before deformation) illustrating how a lower arm according to an embodiment of the present invention deforms when a small overlap collision occurs.
Figure 6B:
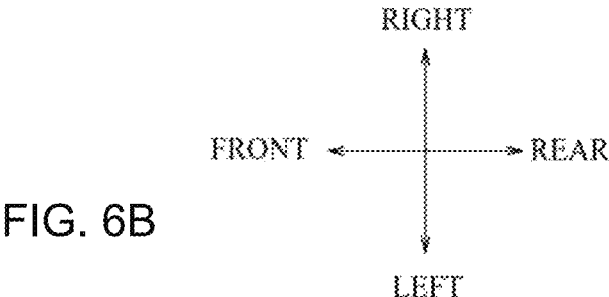
FIG. 6B is a plan view (after deformation) illustrating how the lower arm according to the embodiment of the present invention deforms when a small overlap collision occurs.

FIGS. 6A and 6B are plan views illustrating deformation of the lower arm 1 when a small overlap collision occurs. FIG. 6A illustrates a state before the occurrence of the small overlap collision, and FIG. 6B illustrates a state after the occurrence of the small overlap collision. FIGS. 6A and 6B exemplarily illustrate the lower arm 1 of a front suspension provided for a right front wheel (wheel 300) of an automotive vehicle.

Incidentally, occupant protection performance in such collisions can be evaluated through small overlap crash tests. The small overlap crash test was conducted and published by the Insurance Institute for Highway Safety (IIHS) in the United States at the end of 2012, and is one of offset front crash tests in which 25% of the front of a vehicle on the driver's seat side is caused to collide with a barrier at a speed of 40 miles (approximately 64 km) per hour. In general, this is a crash test for a portion located on the outer side in the vehicle width direction than front side members constituting vehicle body frames.

As illustrated in FIG. 6A, the first region $P_1$ of the lower arm 1 on the wheel side in the present embodiment is connected to the wheel 300 via the wheel side component 200 such as a knuckle or a hub (refer to FIG. 2). The wheel 300 is housed in a front wheel well of the vehicle body, and a side sill 400 of the vehicle body is disposed behind the front wheel well. On the other hand, the second region $P_2$ of the lower arm 1 on the vehicle body side is connected to the vehicle body side component 100 such as the front suspension member as described above.

In the present embodiment, when a small overlap collision occurs in an automotive vehicle, a barrier moves rearward with respect to the vehicle while entering an end of a front bumper, and an impact is applied to the wheel 300. When the input from the barrier acts on the wheel 300, the input from the front also acts on the lower arm 1 supporting the wheel 300. This causes the lower arm 1 of the present embodiment to deform in such a manner that the second region $P_2$ being relatively fragile starts deforming first and the second region $P_2$ bends rearward due to the input from the front (forward direction), as illustrated in FIG. 6B. In this state, since the first region $P_1$ is hardly deformed, the wheel 300 turns toward the rear left as indicated by a hollow arrow and is brought into contact with the side sill 400 located on the rear side of the wheel well. In this manner, the lower arm 1 of the present embodiment causes the wheel 300 to be sandwiched between a collision object and the side sill 400, thereby absorbing the collision energy generated during the small overlap collision.

In addition, because of being configured to be stiff compared with the second region $P_2$, the first region $P_1$ is less likely to deform even when a small overlap collision occurs and accordingly the connection between the wheel 300 and the lower arm 1 can be maintained. Therefore, it is also possible to suppress the loss of the steering function.

Returning to FIG. 1, the main body part 2 in the present embodiment specifically includes a flat plate part 20, a through hole 21, a working hole 22, a plurality of (two in this example) positioning holes 23a and 23b, a rib 24, a first recess 25, a second recess 26, a first flange 27 (refer to FIG. 2 to FIG. 4A), a second flange 28 (refer to FIGS. 3 and 4B), and a narrow-width part 29.

As illustrated in FIG. 1, the flat plate part 20 configures a central portion of the main body part 2 and extends along a direction in which the main body part 2 extends. In the present embodiment, continuous formation of the flat plate part 20 ranges from the left end of the third mounting portion 5 in the first region $P_1$ to just before the second mounting portion 4 in the second region $P_2$.

The second region $P_2$ includes the through hole 21 formed in the flat plate part 20. As illustrated in FIG. 4B, the through hole 21 is a through hole penetrating the flat plate part 20 in a thickness direction (up-and-down direction in the drawing) of the flat plate part 20. The through hole 21 is capable of making the second region $P_2$ fragile compared with the first region $P_1$. This leads to the capability of promoting the deformation of the second region $P_2$ and enhancing the shock absorption as described above and also suppressing the loss of the steering function. The through hole 21 in this embodiment corresponds to an exemplary "third weakened portion" in the present invention.

As illustrated in FIG. 1, the through hole 21 has a first edge 21a and a second edge 21b. The first edge 21a is adjacent to a right end rib 24b (described below) of the rib 24 and is substantially parallel to the contour of a portion of the right end rib 24b adjacent to the first edge 21a. Similarly, the second edge 21b is adjacent to a left rear end rib 24c (described below) of the rib 24 and is substantially parallel to the contour of a portion of the left rear end rib 24c adjacent to the second edge 21b. Compared with a case where a perfect circular through hole is formed in the flat plate part 20, configuring the through hole 21 with the first edge 21a and the second edge 21b as described above can increase the area of the through hole 21 and make the second region $P_2$ fragile than the first region $P_1$.

The flat plate part 20 includes the working hole 22 formed in front of the through hole 21. The working hole 22 of the present embodiment is a through hole having a perfect circle shape in planar view, and formation thereof ranges from the first region $P_1$ to the second region $P_2$. The working hole 22 is for use when causing a tool such as a wrench to penetrate the lower arm 1 to perform a work for a hidden component, during an assembly work on an automotive vehicle installation line.

The positioning hole 23a formed in the flat plate part 20 is located behind the through hole 21. The positioning hole 23a in the present embodiment is a through hole having a perfect circle shape in planar view, and location thereof is in the second region $P_2$. On the other hand, location of the positioning hole 23b is in the first region $P_1$. The positioning hole 23b is the same in shape as the positioning hole 23a. These positioning holes 23a and 23b are through holes used in a pressing machine to position a blank when a metal plate is press-worked to form the main body part 2.

In the present embodiment, the total area of the holes in the second region $P_2$ is greater than the total area of the holes in the first region $P_1$. This makes the second region $P_2$ fragile than the first region $P_1$. A total area $S_1$ in the present embodiment is the sum of a partial area of the working hole 22 located in the first region $P_1$ and the area of the positioning hole 23b. A total area $S_2$ in the present embodiment is the sum of a partial area of the working hole 22 located in the second region $P_2$ and the area of the positioning hole 23a.

The rib 24 having a predetermined width is formed around the flat plate part 20. The rib 24 is a portion of the main body part 2 bent upward so as to protrude and extends along the periphery of the main body part 2 at a region other than the third mounting portion 5. Accordingly, the flat plate part 20 is recessed downward relative to the rib 24 in the main body part 2.

The rib 24 includes a front end rib 24a formed along the front periphery of the main body part 2, the right end rib 24b formed along the right periphery of the main body part 2, and the left rear end rib 24c formed along the left rear periphery of the main body part 2. Although not particularly limited, in the present embodiment, the front end rib 24a, the right end rib 24b, the left rear end rib 24c are integrally formed. The front end rib 24a and the left rear end rib 24c in this embodiment correspond to an exemplary "first reinforced portion" in the present invention.

As illustrated in FIGS. 1 and 2, the front end rib 24a extends in the vehicle width direction, and formation thereof ranges from the first mounting portion 3 to the third mounting portion 5. As illustrated in FIG. 1, the front end rib 24a includes a distal end portion 241a extending toward the third mounting portion 5 so as to overlap with the fixing plate part 81 in the vehicle width direction. The distal end portion 241a corresponds to an exemplary "rib of the first reinforced portion" in the present invention.

Configuring the distal end portion 241a overlapping with the fixing plate part 81 in the vehicle width direction can make the third mounting portion 5 stiff. This leads to the capability of suppressing the deformation of the third mounting portion 5, enhancing the shock absorption when a small overlap collision occurs, and also maintaining the steering function.

Further, the distal end portion 241a has a width increasing as the position approaches to the fixing plate part 81 of the ball joint 8. This configuration enables the distal end portion 241a to make the third mounting portion 5 stiff and suppress the deformation of the third mounting portion 5.

Further, FIGS. 1 and 2 illustrate the front end rib 24a formed with the first recess 25. The provision place of the first recess 25 deviates toward the first mounting portion 3 with respect to the center of the first region $P_1$. The front end rib 24a forms, as a recess thereof, the first recess 25 extending in the vehicle front-rear direction. Providing the first recess 25 deviated toward the first mounting portion 3 with respect to the center of the first region $P_1$ causes the first region $P_1$ to deform starting from the first recess 25 in response to an input acting in a vehicle left-right direction, such as a side collision. Therefore, it is possible to suppress the deformation of the third mounting portion 5. In particular, even in the case of receiving an input acting in the left-right direction in a state where deformation of the second region $P_2$ has already occurred at first to third weakened portions, the first region $P_1$ deforms starting from the first recess 25 and can absorb the collision energy. Thus, it is possible to suppress the deformation of the third mounting portion 5. Although it is desirable to prevent the first region $P_1$ from deforming as much as possible in a small overlap collision, from the consideration that preventing the third mounting portion 5 from deforming as much as possible in a side collision should be prioritized, a fourth weakened portion is purposely provided in the first reinforced portion. The first recess 25 in this embodiment corresponds to an exemplary "fourth weakened portion" in the present invention.

Further, as illustrated in FIG. 2, a bottom surface of the first recess 25 has a substantially V-shaped cross-section shape including a steeper slope than the second recess 26 (refer to FIG. 3) described below. Further, width $W_1$ of the first recess 25 is less than width $W_2$ (refer to FIG. 3) of the second recess 26 described below. Therefore, in the case of occurrence of an input acting from the left side of the vehicle, the first region $P_1$ is easily deformed starting from the first recess 25, and the deformation of the third mounting portion 5 can be suppressed.

As illustrated in FIGS. 1 and 3, the right end rib 24b extends in the vehicle front-rear direction, and formation thereof ranges from the first mounting portion 3 to the second mounting portion 4. The right end rib 24b has a width decreasing as the position approaches from the first mounting portion 3 to the second mounting portion 4 in the second region $P_2$.

The right end rib 24b is the location where the second recess 26 is formed. The provision place of the second recess 26 deviates toward the second mounting portion 4 with respect to the center of the second region $P_2$. The right end rib 24b forms, as a recess thereof, the second recess 26 extending in the vehicle width direction. Providing the second recess 26 in the right end rib 24b of the second region $P_2$ can promote the deformation of the second region $P_2$ when a small overlap collision occurs. This can enhance the shock absorption and can also suppress the loss of the steering function. The second recess 26 in this embodiment corresponds to an exemplary "second weakened portion" in the present invention.

As illustrated in FIG. 3, the second recess 26 has a depth smaller than a depth of the first recess 25, and a bottom surface of the second recess 26 includes a gentle slope compared with the first recess 25 (refer to FIG. 2). Further, the width $W_2$ of the second recess 26 is greater than the width $W_1$ of the first recess 25.

As illustrated in FIG. 1, the left rear end rib 24c extends from the left front direction to the right rear direction, and formation thereof ranges from the third mounting portion 5 to the second mounting portion 4. Like the front end rib 24a, the left rear end rib 24c includes a distal end portion 241c extending toward the third mounting portion 5 so as to overlap with the fixing plate part 81 in the vehicle width direction. Further, like the distal end portion 241a, the distal end portion 241c has a width increasing as the position approaches to the fixing plate part 81 of the ball joint 8. The distal end portion 241*c* also corresponds to an exemplary "rib of the first reinforced portion" in the present invention.

FIGS. 2 and 3 illustrate the first flange 27 formed on a lower surface of the main body part 2. The first flange 27 is formed by bending the front and right peripheries of the main body part 2. FIGS. 4A and 4B illustrate a distal end of the first flange 27 bent toward the inside of the main body part 2. The first flange 27 has a front end portion 27*a* and a right end portion 27*b*.

FIGS. 2 and 4A illustrate the front end portion 27*a* provided on the front periphery of the first region P$_1$ of the main body part 2 and extending in the vehicle width direction. Formation of the front end portion 27*a* ranges from the first mounting portion 3 to the third mounting portion 5. As illustrated in FIG. 5, in the present embodiment, the front end portion 27*a* extends to the periphery that faces the ball joint 8 of the third mounting portion 5. The front end portion 27*a* in this embodiment corresponds to an exemplary "second reinforced portion" in the present invention.

Configuring the front end portion 27*a* of the first flange 27 extending to the periphery of the third mounting portion 5 can make the third mounting portion 5 stiff. This leads to the capability of suppressing the deformation of the third mounting portion 5, when a small overlap collision occurs, and maintaining the steering function.

FIGS. 3 and 4B illustrate the right end portion 27*b* provided at the right periphery of the second region P$_2$ of the main body part 2 and extending in the vehicle front-rear direction.

Formation of the right end portion 27*b* ranges from the first mounting portion 3 to the second mounting portion 4.

In the present embodiment, height H$_1$ of the right end portion 27*b* is less than height H$_2$ of the front end portion 27*a* (H$_1$<H$_2$), and the lower end of the front end portion 27*a* extends further downward than the lower end of the right end portion 27*b*. Setting the height H$_1$ of the right end portion 27*b* of the first flange 27 to be less than the height H$_2$ of the front end portion 27*a* as described above enables the second region P$_2$ to easily bend in the thickness direction of the main body part 2, compared with the first region P$_2$. This leads to the capability of promoting the deformation of the second region P$_2$ when a small overlap collision occurs.

FIGS. 2 to 4 illustrate the second flange 28 formed on the lower surface of the main body part 2 in parallel with the first flange 27. The second flange 28 is formed by bending the left rear periphery of the main body part 2. FIGS. 4A and 4B illustrate a distal end of the second flange 28 bent toward the inside of the main body part 2.

Formation of the second flange 28 ranges from the second mounting portion 4 to the third mounting portion 5. As illustrated in FIG. 5, in the present embodiment, the second flange 28 extends to the periphery that faces the ball joint 8 of the third mounting portion 5. Configuring the second flange 28 extending to the periphery of the third mounting portion 5 can make the third mounting portion 5 stiff. The second flange 28 in this embodiment also corresponds to an exemplary "second reinforced portion" in the present invention.

FIG. 1 illustrates the narrow-width part 29 formed in the second region P$_2$ of the main body part 2. The provision place of the narrow-width part 29 deviates toward the second mounting portion 4 with respect to the center of the second region P$_2$. In the narrow-width part 29, the width of the flat plate part 20 decreases as the position shifts from the first mounting portion 3 to the second mounting portion 4. At the same time, the right end rib 24*b* and the left rear end rib 24*c* extend closer to each other as the position approaches from the first mounting portion 3 to the second mounting portion 4. Therefore, in the narrow-width part 29, the width of the main body part 2 decreases as the position shifts from the first mounting portion 3 to the second mounting portion 4. The narrow-width part 29 in the present embodiment corresponds to an exemplary "first weakened portion" of the present invention.

Providing the narrow-width part 29 in the second region P$_2$ can promote the deformation of the second region P$_2$ when a small overlap collision occurs. This can enhance the absorption capability in vehicle's collision and can also suppress the loss of the steering function.

As described above, the lower arm 1 in the present embodiment is configured such that the second region P$_2$ is fragile compared with the first region P$_1$. This leads to the capability of causing the second region P$_2$ to deform first when a small overlap collision occurs. Specifically, in the case of a small overlap collision, the lower arm 1 in the present embodiment causes the narrow-width part 29 (first weakened portion) and the second recess 26 (second weakened portion) to be bent first, and then the second region P$_2$ to deform. Next, bending occurs in the vicinity of the through hole 21 (third weakened portion), which promotes the deformation of the second region P$_2$. Causing the second region P$_2$ to deform preferentially in this manner makes it possible to sandwich the wheel 300 (refer to FIGS. 6A and 6B) between the collision object and the side sill 400. Accordingly, the collision energy generated during the small overlap collision can be absorbed by the wheel 300 and the side sill 400, which suppresses the deformation of the vehicle body and protects occupants.

The invention claimed is:

1. A lower arm for an automotive vehicle suspension, the lower arm comprising:

a plate-like main body part, wherein the main body part includes:

a first mounting portion extending inward in a vehicle width direction and attached at a distal end thereof to a vehicle body side;

a second mounting portion extending inward in the vehicle width direction and attached at a distal end thereof to the vehicle body side on a rear side of the vehicle body with respect to the first mounting portion; and a third mounting portion extending outward in the vehicle width direction and attached at a distal end thereof to a wheel side, wherein a second portion between the first mounting portion and the second mounting portion of the main body part is configured to be fragile against an input from a front side of the vehicle, compared with a first portion between the first mounting portion and the third mounting portion of the main body part, the second portion includes:

a first weakened portion in which a width of the main body part decreases as the position approaches from the first mounting portion to the second mounting portion, a second weakened portion formed in the first weakened portion and extending, as a recess of the main body part, in the vehicle width direction, and the second weakened portion is formed on the inside of the first weakened portion in the vehicle width direction.

2. The lower arm according to claim 1, wherein
the second portion includes a third weakened portion constituted by a through hole formed in the main body part.

3. The lower arm according to claim 1, wherein
the first portion includes a first reinforced portion constituted by a rib extending, as a protrusion of the main body part, in the vehicle width direction, and
the rib of the first reinforced portion extends toward the third mounting portion so as to overlap with a mounting portion of a ball joint attached to the third mounting portion in the vehicle width direction.

4. The lower arm for an automotive vehicle suspension according to claim 3, wherein
the rib of the first reinforced portion has a width increasing as the position shifts toward the mounting portion of the ball joint.

5. The lower arm according to claim 1, wherein
the first portion includes a second reinforced portion constituted by a flange being a bent periphery of the main body part and extending to the third mounting portion in the vehicle width direction.

6. The lower arm according to claim 1, wherein
the first portion includes a fourth weakened portion deviating toward the first mounting portion with respect to the center of the first portion and extending as a recess of the main body part in a vehicle front-rear direction.

\* \* \* \* \*